United States Patent
Liu

(10) Patent No.: US 9,368,766 B2
(45) Date of Patent: Jun. 14, 2016

(54) FIVE-POLE BATTERY

(71) Applicant: GUANGDONG JETFAST PORTABLE LIGHTING CO., LTD., Guangdong (CN)

(72) Inventor: Yun-Zhao Liu, Guangdong Province (CN)

(73) Assignee: Guangdong Jetfast Portable Lighting Co., Ltd., Guangdong (CN)

( * ) Notice: Subject to any disclaimer, the term of this patent is extended or adjusted under 35 U.S.C. 154(b) by 334 days.

(21) Appl. No.: 14/228,482

(22) Filed: Mar. 28, 2014

(65) Prior Publication Data

US 2015/0280179 A1 Oct. 1, 2015

(51) Int. Cl.
*H01M 6/42* (2006.01)
*H01M 2/10* (2006.01)

(52) U.S. Cl.
CPC ........ *H01M 2/1022* (2013.01); *H01M 2220/30* (2013.01)

(58) Field of Classification Search
CPC ... H01M 2/1022; H01M 2/0456; H01M 2/06; H01M 2/26; H01M 2/30; H01M 2/305; H01M 2220/30
See application file for complete search history.

(56) References Cited

U.S. PATENT DOCUMENTS

| 2011/0189513 A1* | 8/2011 | Suzuki | B23K 20/12 429/53 |
| 2011/0200856 A1* | 8/2011 | Yasui | H01M 2/1016 429/88 |
| 2011/0236728 A1* | 9/2011 | Uchida | H01M 2/204 429/7 |
| 2012/0263995 A1* | 10/2012 | Naito | H01M 2/1077 429/146 |

* cited by examiner

*Primary Examiner* — Raymond Alejandro
(74) *Attorney, Agent, or Firm* — Rosenberg, Klein & Lee

(57) ABSTRACT

A battery includes a case, a first cap unit on the first end of the case, a second cap unit on the second end of the case, a first connector, and a second connector. The case has three chambers in which a first battery, a second battery and a third battery are respectively received. The first positive pole of the first connector is connected to the first cap unit, a second positive-pole terminal of the first connector is connected to the second cap unit. A second negative-pole terminal of the second connector is connected to the first cap unit, and a third negative-pole terminal of the second connector is connected to the second cap unit. The first, second and third batteries are rechargeable or non-rechargeable batteries. The five positive poles and negative poles in different directions provide convenience for being connected with different devices.

6 Claims, 5 Drawing Sheets

1

FIVE-POLE BATTERY

BACKGROUND OF THE INVENTION

1. Fields of the Invention

The present invention relates to a battery, and more particularly, to a battery having five poles for convenience of being connected with different devices.

2. Descriptions of Related Art

The conventional batteries are used for different devices such as laptops, cellular phones, digital cameras and flat panels so as to conveniently provide suitable electric power to the devices to make the devices be portable. Some of the batteries are rechargeable.

The rechargeable batteries meet the requirements of use for most of the portable devices, however, the rechargeable batteries each have only one positive pole on one end and a negative pole on the other end. This restricts the ways of connection of the devices.

The present invention intends to provide a battery which has five poles so as to be flexible when being connected with different devices.

SUMMARY OF THE INVENTION

The present invention relates to a battery and comprises a case having a first cap unit connected to the first end thereof, and a second cap unit is connected to the second end of the case. The case has three chambers defined therein, and a first battery, a second battery and a third battery are respectively located in the three chambers. The first positive pole of each of the first and third batteries face the first cap unit, and the negative pole of each of the first and third batteries face the second cap unit. The negative pole of the second battery faces the first cap unit, and the positive pole of the second battery faces the second cap unit. A positive-pole connector is connected to the positive pole of the first battery, and a first conductive member is connected between the negative pole of the second battery and the positive pole of the third battery. A negative-pole connector is connected to the negative pole of the third battery, and a second conductive member is connected between the negative pole of the first battery and the positive pole of the second battery.

The first cap unit has a first end cap and a first isolation member mounted to the outside of the first end cap, and a first collar mounted to the outside of the first isolation member.

The second cap unit has a second end cap and a first negative-pole terminal located at the center of the second end cap. The first negative-pole terminal extends through the second end cap and is connected with the negative-pole connector. A second isolation member is mounted to the outside of the second end cap. A second collar is mounted to the outside of the second isolation member.

A first connector has a first positive-pole terminal on the first end thereof, and the first positive-pole terminal is clamped between the first end cap and the first isolation member. The first positive-pole terminal extends through the first end cap and is connected with the positive-pole connector.

A second positive-pole terminal is formed on the second end of the first connector. The second positive-pole terminal is clamped between the second isolation member and the second collar.

A second connector has a second negative-pole terminal on the first end thereof. The second negative-pole terminal is clamped between the first isolation member and the first collar. A third negative-pole terminal is formed on the second

2 end of the second connector. The third negative-pole terminal is clamped between the second end cap and the second isolation member.

Preferably, the first, second and third batteries are non-rechargeable batteries.

Preferably, the first, second and third batteries are rechargeable batteries.

Preferably, the first isolation member of the first cap unit has a first isolation ring extending therefrom. The second negative-pole terminal of the second connector is not in contact with the first positive-pole terminal of the first connector by the first isolation ring of the first isolation member.

Preferably, the second end cap of the second cap unit has a second isolation ring extending therefrom. The third negative-pole terminal of the second connector is not in contact with the first negative-pole terminal of the second cap unit by the second isolation ring of the second end cap.

Preferably, the second isolation member of the second cap unit has a third isolation ring extending therefrom. The third negative-pole terminal of the second connector is not in contact with the second positive-pole terminal of the first connector by the third isolation ring of the second isolation member.

The primary object of the present invention is to provide a battery wherein the first, second and third batteries are rechargeable or non-rechargeable batteries. The five positive poles and negative poles in different directions provide convenience for being connected with different devices.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
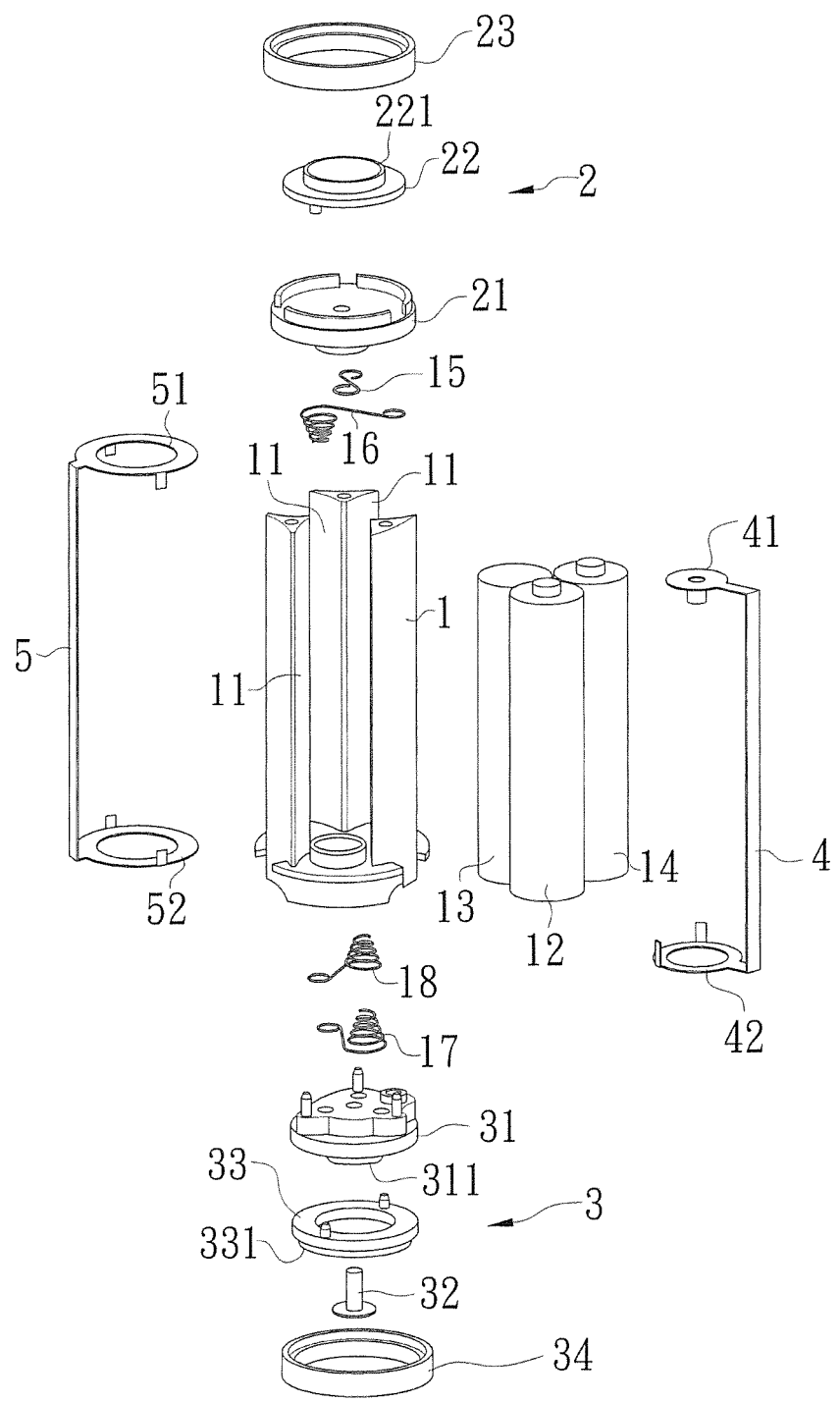
FIG. 1 is an exploded view of the battery of the present invention.
Figure 2:
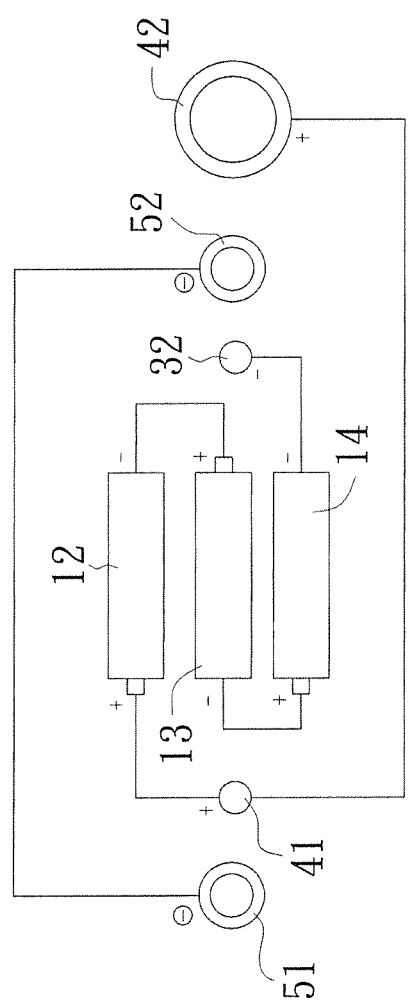
FIG. 2 illustrates the connections between the parts of the battery of the present invention.
Figure 3:
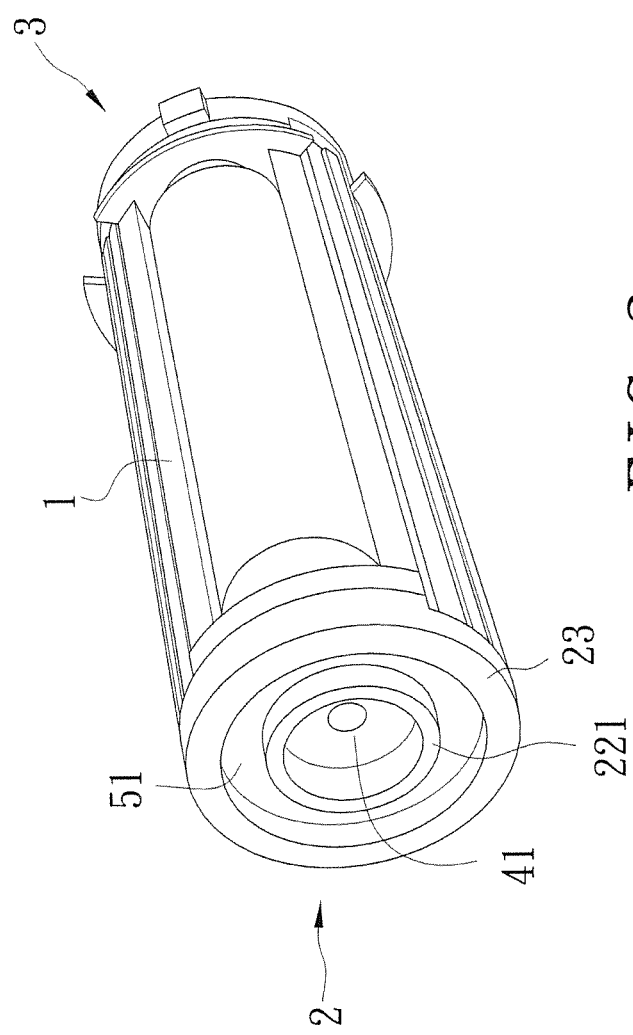
FIG. 3 is a perspective view, viewed from the first end, of the battery of the present invention.
Figure 4:
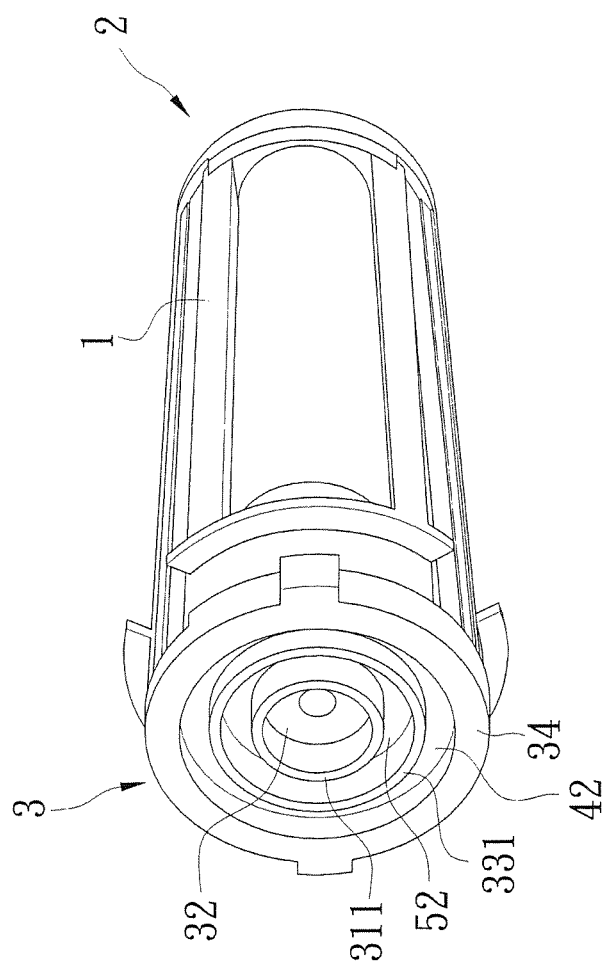
FIG. 4 is a perspective view, viewed from the second end, of the battery of the present invention.

Referring to FIGS. 1 to 4, the battery of the present invention comprises a case 1, a first cap unit 2, a second cap unit 3, a first connector 4 and a second connector 5.

The case 1 has the first cap unit 2 connected to the first end thereof, and the second cap unit 3 connected to the second end of the case 1. The case 1 has three chambers 11 defined therein, and a first battery 12, a second battery 13 and a third battery 14 are respectively located in the three chambers 11. The first, second and third batteries 12, 13, 14 are non-rechargeable or rechargeable batteries. The first positive pole of each of the first and third batteries 12, 14 face the first cap unit 2, and the negative pole of each of the first and third batteries 12, 14 face the second cap unit 3. The negative pole of the second battery 13 faces the first cap unit 2, and the positive pole of the second battery 13 faces the second cap unit 3. A positive-pole connector 15 is connected to the positive pole of the first battery 12. A first conductive member 16 is connected between the negative pole of the second battery 13 and the positive pole of the third battery 14. A negative-pole connector 17 is connected to the negative pole of the third battery 14, and a second conductive member 18 is connected between the negative pole of the first battery 12 and the positive pole of the second battery 13.

The first cap unit 2 has a first end cap 21 and a first isolation member 22 is mounted to the outside of the first end cap 21. A first collar 23 is mounted to the outside of the first isolation member 22. The first isolation member 22 of the first cap unit 2 has a first isolation ring 221 extending therefrom.

The second cap unit 3 has a second end cap 31 and a first negative-pole terminal 32 is located at the center of the second end cap 31. The first negative-pole terminal 32 extends through the second end cap 31 and is connected with the negative-pole connector 17. The second end cap 31 of the second cap unit 3 has a second isolation ring 311 extending therefrom. A second isolation member 33 mounted to the outside of the second end cap 31. The second isolation member 33 has a third isolation ring 331 extending therefrom. A second collar 34 is mounted to the outside of the second isolation member 33.

The first connector 4 has a first positive-pole terminal 41 on the first end thereof. The first positive-pole terminal 41 being clamped between the first end cap 21 and the first isolation member 22. The first positive-pole terminal 41 extends through the first end cap 21 and is connected with the positive-pole connector 15. A second positive-pole terminal 42 is formed on the second end of the first connector 4. The second positive-pole terminal 42 is clamped between the second isolation member 33 and the second collar 34.

The second connector 5 has a second negative-pole terminal 51 on the first end thereof, the second negative-pole terminal 51 is clamped between the first isolation member 22 and the first collar 23. The second negative-pole terminal 51 of the second connector 5 is not in contact with the first positive-pole terminal 41 of the first connector 4 by the first isolation ring 221 of the first isolation member 22. A third negative-pole terminal 52 is formed on the second end of the second connector 5. The third negative-pole terminal 52 is clamped between the second end cap 31 and the second isolation member 33. The third negative-pole terminal 52 of the second connector 5 is not in contact with the first negative-pole terminal 32 of the second cap unit 3 by the second isolation ring 311 of the second end cap 31. The third negative-pole terminal 52 of the second connector 5 is not in contact with the second positive-pole terminal 42 of the first connector 4 by the second isolation ring 311 of the second end cap 31.

When in use, the first negative-pole terminal 32 of the second cap unit 3, the first positive-pole terminal 41 and the second positive-pole terminal 42 of the first connector 4, the second negative-pole terminal 51 and the third negative-pole terminal 52 of the second connector 5 provide positive poles and negative poles in different directions so as to be connected with different devices.

Figure 5:
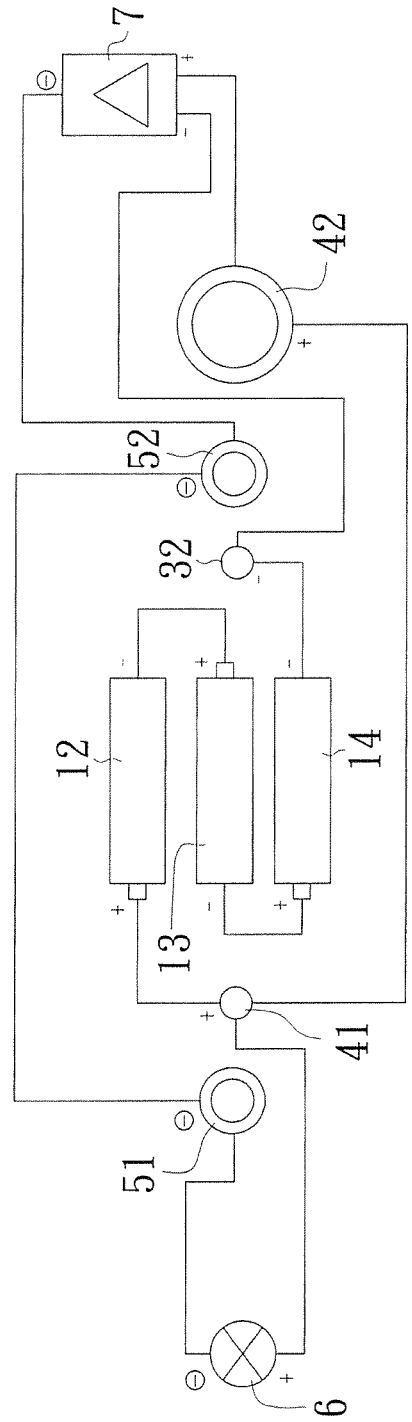
FIG. 5 illustrates the connection between a flashlight and the battery of the present invention.

As shown in FIG. 5, when connecting a flashlight to the battery of the present invention, a light source 6 is connected between the first positive-pole terminal 41 of the first connector 4 and the second negative-pole terminal 51 of the second connector 5. A control unit 7 is connected between the first negative-pole terminal 32, the second positive-pole terminal 42 and the third negative-pole terminal 52. The first negative-pole terminal 32 and the second positive-pole terminal 42 provide power to the control unit 7. The control unit 7 controls the connection between the first negative-pole terminal 32 and the third negative-pole terminal 52, so that the light source 6 is powered and lights up.

The advantages of the present invention are that the first, second and third batteries 12, 13, 14 in the chambers 11 of the case 1 are non-rechargeable or rechargeable batteries so as to meet different requirements when connected with different devices. Furthermore, the first negative-pole terminal 32 of the second cap unit 3, the first positive-pole terminal 41 and the second positive-pole terminal 42 of the first connector 4, the second negative-pole terminal 51 and the third negative-pole terminal 52 of the second connector 5 provide positive poles and negative poles in different directions so as to be connected with different devices.

While we have shown and described the embodiment in accordance with the present invention, it should be clear to those skilled in the art that further embodiments may be made without departing from the scope of the present invention.

What is claimed is:

1. A battery comprising:
a case having a first cap unit connected to a first end thereof, a second cap unit connected to a second end of the case, the case having three chambers defined therein, a first battery, a second battery and a third battery respectively located in the three chambers, a first positive pole of each of the first and third batteries facing the first cap unit, a negative pole of each of the first and third batteries facing the second cap unit, a negative pole of the second battery facing the first cap unit, a positive pole of the second battery facing the second cap unit, a positive-pole connector connected to the positive pole of the first battery, a first conductive member connected between the negative pole of the second battery and the positive pole of the third battery, a negative-pole connector connected to the negative pole of the third battery, a second conductive member connected between the negative pole of the first battery and the positive pole of the second battery;

the first cap unit having a first end cap and a first isolation member mounted to an outside of the first end cap, a first collar mounted to an outside of the first isolation member;

the second cap unit having a second end cap and a first negative-pole terminal located at a center of the second end cap, the first negative-pole terminal extending through the second end cap and connected with the negative-pole connector, a second isolation member mounted to an outside of the second end cap, a second collar mounted to an outside of the second isolation member;

a first connector having a first positive-pole terminal on a first end thereof, the first positive-pole terminal being clamped between the first end cap and the first isolation member, the first positive-pole terminal extending through the first end cap and being connected with the positive-pole connector, a second positive-pole terminal formed on a second end of the first connector, the second positive-pole terminal being clamped between the second isolation member and the second collar, and a second connector having a second negative-pole terminal on a first end thereof, the second negative-pole terminal being clamped between the first isolation member and the first collar, a third negative-pole terminal formed on a second end of the second connector, the third negative-pole terminal being clamped between the second end cap and the second isolation member.

2. The battery as claimed in claim 1, wherein the first, second and third batteries are non-rechargeable batteries.

3. The battery as claimed in claim 1, wherein the first, second and third batteries are rechargeable batteries.

4. The battery as claimed in claim 1, wherein the first isolation member of the first cap unit has a first isolation ring extending therefrom, the second negative-pole terminal of the second connector is not in contact with the first positive-pole terminal of the first connector by the first isolation ring of the first isolation member.

5. The battery as claimed in claim 1, wherein the second end cap of the second cap unit has a second isolation ring extending therefrom, the third negative-pole terminal of the second connector is not in contact with the first negative-pole terminal of the second cap unit by the second isolation ring of the second end cap.

6. The battery as claimed in claim 1, wherein the second isolation member of the second cap unit has a third isolation ring extending therefrom, the third negative-pole terminal of the second connector is not in contact with the second positive-pole terminal of the first connector by the third isolation ring of the second isolation member.

* * * * *